United States Patent Office 3,242,235
Patented Mar. 22, 1966

3,242,235
PHYTATE SALTS OF THE TETRACYCLINES
Charles Riffkin, Highland Park, and Ralph E. Bennett, Princeton, N.J., assignors, by mesne assignments, to E. R. Squibb & Sons, Inc., New York, N.Y., a corporation of Delaware
No Drawing. Filed June 13, 1963, Ser. No. 287,507
5 Claims. (Cl. 260—926)

This invention relates to new physiologically active salts of certain broad spectrum antibiotics. More particularly, this invention relates to the provision of novel physiologically active phytate salts of such broad spectrum antibiotics as tetracycline,
demethyltetracyclines,
chlortetracyclines,
deoxytetracyclines,
oxytetracyclines,
ethyldemethyltetracyclines,
ethyldemethylchlortetracyclines,
deoxydemethyltetracyclines,
demethylchlortetracyclines, and other like antibiotics, and to methods of their production.

The formulation of such antibiotics as set forth hereinabove, so that they will be acceptable by the various routes of administration, presents many problems. For example, a thoroughly satisfactory orally administrable form of such antibiotics is not yet available commercially. It is necessary that such an orally administrable form be easily administrable, have a satisfactorily high absorption rate in the gastrointestinal tract, give constant and uniform blood levels, be free of undesirable metal ions, e.g., sodium ions, in the treatment of patients whose therapy dictates avoidance thereof, possess stability on standing, and be non-toxic and free from harmful local effects.

It has now been found that the novel salts of this invention solve the problems heretofore preventing the oral use of such broad spectrum antibiotics. Absorption is increased, blood levels are high and constant, and the final products of this invention are free from harmful or toxic substances.

The new products of this invention may be prepared by combining in solution an alkali metal phytate, e.g., sodium phytate, with the broad spectrum antibiotic, for example, tetracycline, chlortetracycline, demethyltetracycline, and the like, in the presence of an alkali metal removing ion exchange resin, to form the phytate salt of the chosen antibiotic. This phytate salt may then be dried by any of the conventional methods known to the art, for example, lyophilization, drum drying and the like, to form a storageably stable powder, which may then be further processed to form pills, capsules or other oral dosage forms. Most preferable results are obtained when the oral dosage forms contain 25 to 100% by weight of the new phytate salts, the remainder comprised of pharmaceutical excipients and carriers as desired.

More particularly, the practice of this invention involves agitating an aqueous mixture of a soluble alkali metal phytate (e.g., sodium phytate) with an insoluble antibiotic (e.g., tetracycline) in the presence of a strong sulfonic acid cation exchange resin (for example, IR–120, 122 or 124 [Rohm & Haas] in the acid cycle) until a clear solution is produced. Alternatively, any water insoluble phytate compound, for example, phytin or calcium phytate, may be slurried with the cationic exchange resin, followed by reaction with an antibiotic (e.g., tetracycline) to yield the phytate salt of the antibiotic. Another method that may also be employed requires the antibiotic base to be reacted directly with phytic acid to yield the required phytate salt.

While it is possible to get satisfactory results with a wide range of quantities of reactants, it has been found that only the minimum phytate content to effectively enhance the antibiotic level in the blood should be employed, to preserve the highest antibiotic potency in the final product. It has been found that the best results are obtained when the antibiotic represents 40 to 90% by weight of the final product, and the phytate represents from 10 to 60% by weight of the final product.

If the salts of this invention are to be employed in a liquid formulation, they may be used at the pH of formation, or they may be adjusted after their formation by any manner known to the art, as by treatment with organic or inorganic bases such as N-methyl-glucamine, ethanolamine, sodium hydroxide and the like.

The invention may be illustrated by the following examples.

*Example 1.—Tetracycline phytate*

Three grams of commercial sodium phytate are dissolved in 10 ml. distilled water. IR–124 (Rohm & Haas) resin in the hydrogen cycle is added until the pH is lowered to 1.5–1.8. Five grams of tetracycline base are added with stirring and warming until a clear dark amber solution results. The ion exchange resin is then filtered off and the clear amber solution of tetracycline phytate is frozen and lyophilized to yield 6.6 grams of light golden colored powder containing approximately 4% moisture, having a microbiological assay of 650 mcg./mg. of tetracycline, and a melting point of about 230–235° C.

*Analysis.*—Calcd.: N, 3.65%; P, 8.4%. Found: N, 3.92%; P, 8.4%.

Similarly, substituting equivalent amounts of the free bases of such antibiotics as oxytetracycline, chlortetracycline, demethyltetracycline, deoxytetracycline, demethylchlortetracycline and deoxydemethyltetracycline for tetracycline, there is obtained the respective phytate salts thereof.

*Example 2.—Demethyltetracycline phytate*

Two grams of sodium phytate are dissolved in 10 ml. distilled water. IR–124 (Rohm & Haas) resin in the hydrogen cycle is added, with stirring, until the pH drops to 2.1. Five grams of demethyltetracycline base are then added with stirring continued, and an additional amount of the sulfonic acid cation exchange resin added until a clear, dark amber solution results. The resin is then filtered off and the clear amber solution at pH 1.6 is frozen and lyophilized, to yield 5.6 grams of golden yellow crystalline demethyltetracycline phytate.

*Example 3.—Oxytetracycline phytate*

Three grams of sodium phytate are dissolved in distilled water and treated with a strong sulfonic acid cation exchange resin (IR–124, Rohm & Haas) until the pH is lowered to 1.5. The phytic acid so formed is reacted with oxytetracycline base as in Example No. 1 to form oxytetracycline phytate, the resin filtered off and the clear amber solution poured into an excess of acetone-ether. The precipitated oxytetracycline phytate is filtered off and air dried to yield oxytetracycline phytate. Analysis shows the product to consist of 65% oxytetracycline and 35% phytate.

*Example 4.—Chlortetracycline phytate*

Three grams of sodium phytate are dissolved in distilled water and treated with IR–124 (Rohm & Haas) resin as in Example 3. Five gms. of chlortetracycline base are then added and the chlortetracycline phytate solution obtained after filtering off the resin is evaporated to dryness in vacuum at 30° C. Analysis of the dry powder shows that it is composed of approximately 60% chlortetracycline and 40% phytate.

Formulation of the dry powders obtained in the foregoing illustrations, into acceptable dosage forms such as tablets, capsules or oral liquids may involve further treatment. For example, it may be necessary to compact the powders to increase their bulk density so that a minimum of space is occupied by the required weight for a normal dose. Modification of the solubility, flavoring, coloring, etc., may also be advisable in order to make the medication more acceptable. Residual moisture in the powders should be held to a minimum in order to obtain the most stable product.

*Example 5*

To 200 ml. distilled water are added 75 gms. phytic acid 40% aqueous solution. To the clear acid solution are added 75 gms. tetracycline base with stirring and warming to 55° C. A clear brown solution results in a few minutes, with a pH of 1.7. The solution is then frozen and lyophilized to yield 98.5 gms. of bright yellow powder which assayed 649 mcg./mg. tetracycline activity.

*Example 6*

Four grams of phytin are stirred in 25 ml. distilled water. IR-120 (Rohm & Haas) resin is added with stirring and warming until the slurry changes to a clear solution containing only the resin in suspension. Five grams of tetracycline base are added and the stirring continued until a clear amber solution results. The resin is then filtered off and the solution frozen and lyophilized. The product resembles the gold-colored powder obtained in Example 1.

The following examples illustrate the formulations which can be employed in the oral administration of the novel salts of this invention.

*Example 7*

Tetracycline phytate, activity, mg./tablet _____ 250
Corn starch, percent _____ 5
Spray dried lactose, q.s., mg./tablet _____ 400

The quantities of the above ingredients are mixed and granulated with 50% aqueous ethanol. The mixture is then dried to a moisture content of 2 to 4% and compressed into tablets which are then subsequently coated with a sugar film to provide protection from air and moisture.

*Example 8*

Tetracycline phytate, equivalent to 125 mg./5 ml., gms. activity _____ 2.5
N-methyl glucamine, gms. _____ 2.0
Sucrose, gms. _____ 20.0
Methylcellulose, gms. _____ 1.0
Lemon flavor, ml. _____ 0.2
Distilled water, q.s., ml. _____ 100

The methylcellulose is dissolved in approximately 50 ml. of distilled water with stirring; the tetracycline phytate is added with continued stirring and then the sucrose. Next, the N-methyl glucamine is added with continued stirring, until a fine homogeneous suspension is produced. Finally, the lemon flavor is added and stirred for 30 minutes.

The novel salts of this invention were compared for oral activity with tetracycline phosphate complex. The procedure and results are reported in the following example.

*Example 9*

Tetracycline phosphate complex was compared to tetracycline phytate by administering dry-filled capsules orally to pure-bred dogs at a level of 10 mg./kg. Blood samples were taken periodically, frozen, and assayed after all the samples had been obtained. The assays were carried out by the agar plate diffusion methtod with *B. cereus* ATCC 9634 as the test organism. Part I of the test was carried out, and Part II of the crossover was performed one week later.

TABLE I.—TETRACYCLINE IN DOG PLASMA

| Formulation administered | Dog No. | Tetracycline level (mcg./ml.) hours after oral administration | | | | |
|---|---|---|---|---|---|---|
| | | 0 hr. | 1 hr. | 3 hr. | 5 hr. | 7 hr. |
| Tetracycline phosphate Complex, assayed 725 mcg./mg.: | | | | | | |
| Part I | A | neg | 1.6 | 1.4 | 1.2 | 0.87 |
| | B | neg | 1.3 | 1.2 | 0.86 | 0.65 |
| | C | neg | 1.6 | 1.5 | 0.90 | 0.68 |
| | D | neg | 0.68 | 0.97 | 0.75 | 0.62 |
| Part II | A | neg | 2.0 | 1.6 | 1.3 | 0.96 |
| | J | neg | 1.5 | 1.4 | 1.1 | 0.77 |
| | E | neg | 1.3 | 1.1 | 0.82 | 0.65 |
| | K | neg | 1.1 | 0.83 | 0.64 | 0.50 |
| Tetracycline phytate, assayed 646 mcg./mg.: | | | | | | |
| Part I | E | neg | 2.6 | 1.9 | 1.9 | 1.2 |
| | F | neg | 1.4 | 2.6 | 1.8 | 1.2 |
| | G | neg | 3.6 | 8.2 | 6.4 | 4.1 |
| | H | neg | 0.20 | 2.2 | 1.4 | 1.2 |
| Part II | C | neg | 2.8 | 2.5 | 2.1 | 1.7 |
| | L | neg | 1.7 | 2.3 | 1.9 | 1.6 |
| | G | neg | 1.8 | 3.4 | 3.0 | 2.1 |
| | M | neg | 2.1 | 1.9 | 1.3 | 0.81 |

The invention may be variously otherwise embodied within the scope of the appended claims.

What is claimed is:
1. The phytate salt of an antibiotic selected from the group of broad spectrum antibiotics consisting of tetracycline, oxytetracycline, chlortetracycline, demethyltetracycline, demethylchlortetracycline and deoxytetracycline.
2. Tetracycline phytate.
3. Chlortetracycline phytate.
4. Oxytetracycline phytate.
5. Demethyltetracycline phytate.

No references cited.

NICHOLAS S. RIZZO, *Primary Examiner.*